United States Patent [19]

Barcak

[11] 4,165,720
[45] Aug. 28, 1979

[54] FUEL INTAKE SYSTEM FOR INTERNAL COMBUSTION ENGINE

[76] Inventor: Joseph S. Barcak, 3416 N. 44th St., Phoenix, Ariz. 85008

[21] Appl. No.: 855,563

[22] Filed: Nov. 29, 1977

[51] Int. Cl.² .............................................. F01P 3/00
[52] U.S. Cl. .............................. 123/41.31; 123/122 R
[58] Field of Search .......... 123/41.31, 122 R, 119 CD

[56] References Cited

U.S. PATENT DOCUMENTS

| Re. 19,350 | 10/1934 | Munters | 123/122 R |
|---|---|---|---|
| 1,953,809 | 4/1934 | Kenneweg | 123/122 R |
| 2,354,227 | 7/1944 | Szekely | 173/41.31 |
| 3,232,044 | 2/1966 | Gretzmuller | 123/41.31 |
| 3,855,980 | 12/1974 | Weisz | 123/122 E |
| 3,892,211 | 7/1975 | Oyama | 123/122 R |
| 4,036,188 | 7/1977 | Sami | 123/41.31 |

*Primary Examiner*—Ronald H. Lazarus

[57] ABSTRACT

A fuel intake system for an internal combustion engine which includes a cooling water jacket surrounding the intake manifold to cool at least the air component of a fuel-air combustion charge just prior to its introduction into the combustion chambers of the engine.

1 Claim, 5 Drawing Figures

FUEL INTAKE SYSTEM FOR INTERNAL COMBUSTION ENGINE

This invention relates to an improved fuel intake system for an internal combustion engine.

More particularly, the invention concerns a fuel intake system which is specially adapted to cool at least the air component of a fuel-air combustion charge prior to its introduction into the combustion chambers of the engine.

In another aspect, the invention pertains to a fuel intake system which is particularly suited for use with super-charged or turbo-charged inventions in which the air component of the fuel-air charge is heated by compression, the improved fuel intake system herein described serving to reduce the temperature of the air component, increasing the density of the fuel-air charge fed to the combustion chambers.

In still another and more specific aspect, the invention relates to a fuel intake system for a so called "blown" engine, either carbureted or fuel injected.

The power output of an internal combustion engine, either a piston engine or a rotary engine, is directly related to the weight of the fuel-air mixture which can be introduced into the combustion chamber during each cycle or operation. The weight of the fuel-air charge which can be introduced during each cycle is, in turn, dependent on the density and, therefore, upon the temperature of the charge just prior to its introduction into the combustion chambers.

The fuel, e.g., gasoline, methanol or the like, is usually at a relatively low temperature dictated by ambient conditions. However, the air component of the fuel-air combustion charge may be at a relatively elevated temperature, especially if the engine is either super-charged or turbo-charged, as the compression of the air component increases the temperature thereof according to principles well known in the art. For example, air temperature as high as 600° F. may be encountered at the combustion chamber inlet ports of a turbo-charged engine.

Any reduction in the temperature of at least the air component of the fuel-air charge provided at the inlet ports of the combustion chambers would produce an increase in the power output of the engine, as the density of the fuel-air charge and, therefore, the weight of charge which is introduced into the combustion chamber during each cycle is increased.

It is therefore an object of the invention to provide an improved fuel intake system for an internal combustion engine.

Yet another object of the invention is to provide a fuel intake system which increases the power output of the engine.

Yet another object of the invention is to provide a fuel intake system specially adapted to cool and densify at least the air component of the fuel-air charge fed to the combustion chambers of an internal combustion engine.

Yet another and more specific object of the invention is to provide an improved fuel intake system for increasing the power output of a turbo-charged or super-charged engine.

Yet another and further more specific object of the invention is to provide a fuel intake system which provides operating advantages even when utilized with a normally aspirated engine.

These and other, further and more specific objects and advantages of the invention will be apparent to those skilled in the art from the following detailed description thereof, taken in conjunction with the drawings in which.

Briefly, in accordance with the invention, I provide improvements in a fuel intake system for an internal combustion engine. The prior art intake systems normally include means for forming a fuel-air combustion charge and means defining an inlet manifold for conducting at least the air component of the charge to the inlet ports of the combustion chambers of the engine. Thus, the improvements of the present invention may be made in the fuel intake system of either a carbureted or a fuel injected engine.

The improvement of the present invention cools the air component of the combustion charge before it is introduced into the combustion chambers. The improvement comprises means defining a plenum to receive at least the air component of the charge, conduit means for conducting at least the air component of the charge from the plenum to the inlet port of each of the combustion chambers and a cooling water jacket surrounding at least the conduit means for conducting cooling water to and around substantially the entire outer surfaces of the conduit means, thereby cooling at least the air component of the combustion charge by indirect heat exchange with cooling water circulating through the cooling water jacket.

Figure 1:
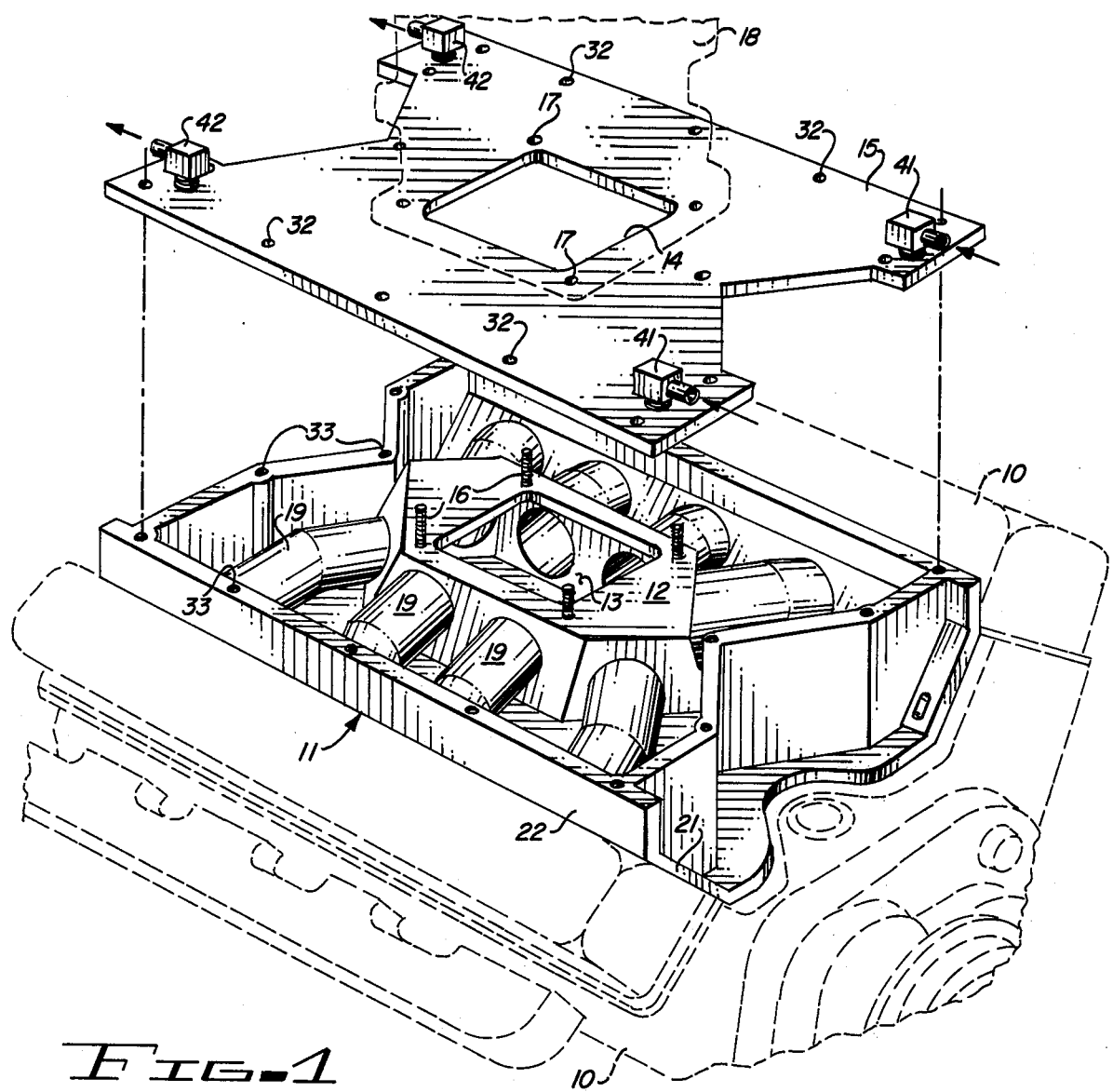
FIG. 1 is a partially exploded perspective view of a typical V8 piston engine (shown by dash lines) and the presently preferred embodiment of the fuel intake system of the present invention.

Turning now to the drawings, in which like reference characters identify the same elements in the several views, FIG. 1 depicts a conventional V8 piston engine, shown by the dash lines 10. The conventional fuel intake system has been removed and replaced by a fuel intake system, generally indicated by reference character 11, which incorporates the presently preferred embodiment of the present invention. The improved fuel intake system 11 includes a plenum 12 for an opening 13 which registers with an opening 14 in the cover plate 15 and upstanding threaded studs 16 which are extended through the holes 17 in the cover plate 15, the extending tips thereof serving as mounting studs for the carburetor 18, shown by dash lines. The plenum 12 is connected by conduits 19 to apertures 20 in the sloped lower side walls 21 of the fuel intake system 11.

The apertures 20 register with the inlet ports of each of the cylinders of the V8 engine 10. The entire assembly 11 is bolted into place on the engine 10 by means of threaded studs extending into the fuel intake system 11 through the holes 31 of the sloped lower side walls 21.

Figure 2:
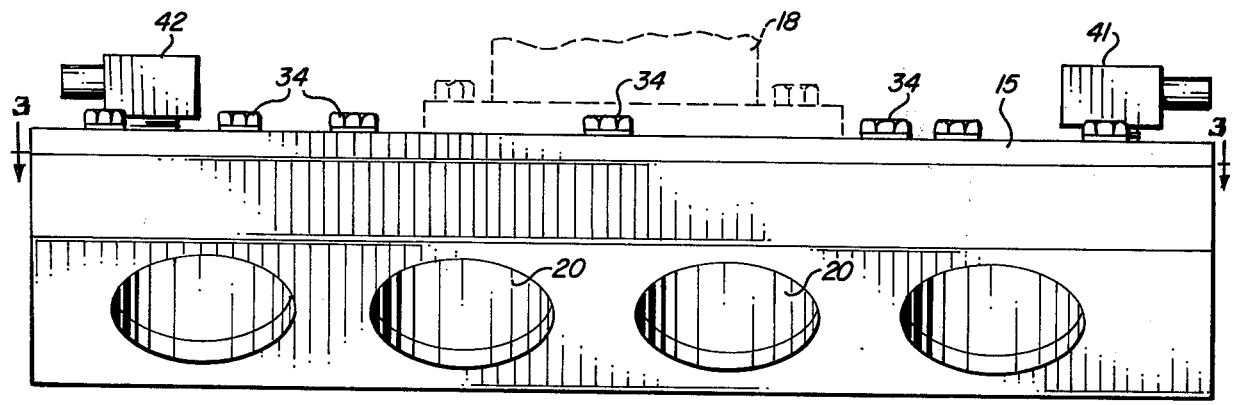
FIG. 2 is a side view of the intake manifold of FIG. 1.
Figure 3:
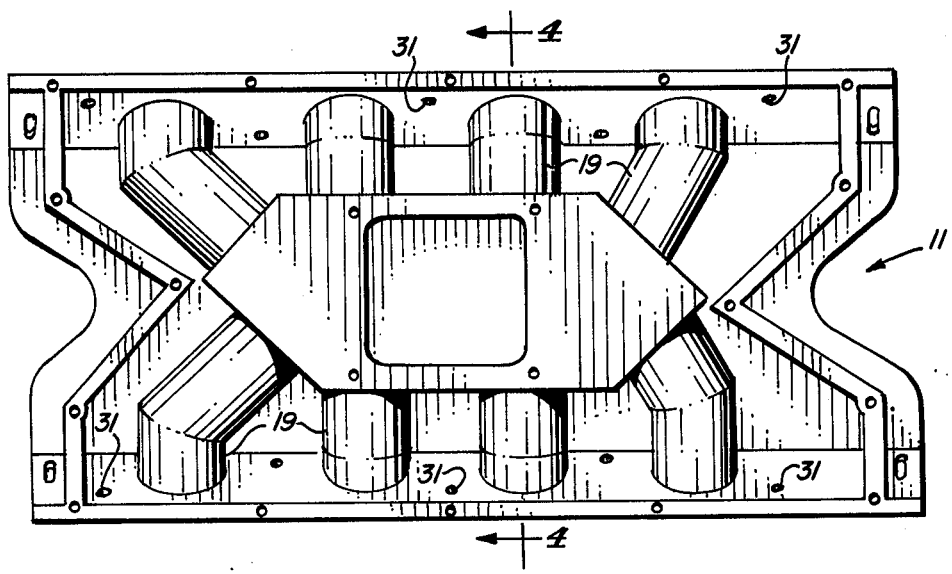
FIG. 3 is a top view of the intake manifold of FIGS. 1-2.
Figure 4:
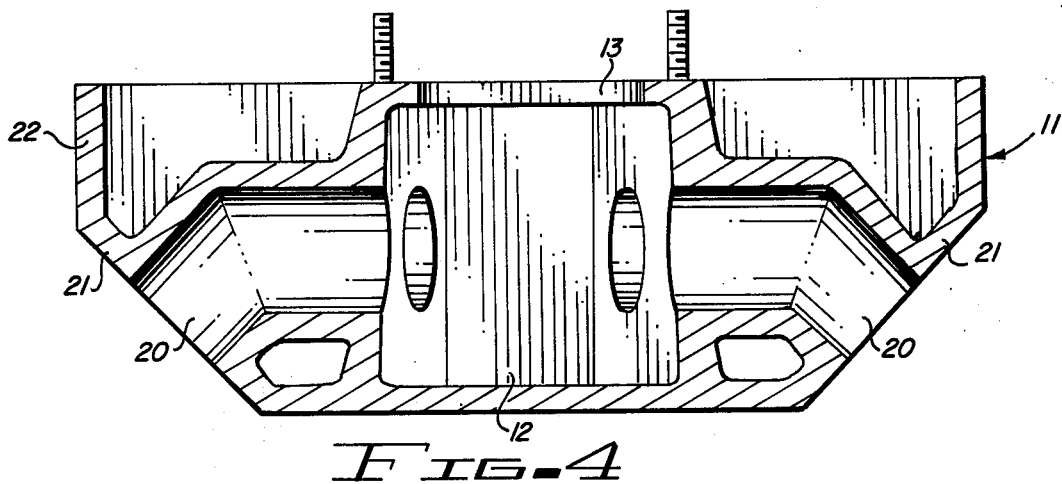
FIG. 4 is a sectional view of the intake manifold of FIG. 3 taken along section line 4—4 thereof.
Figure 5:
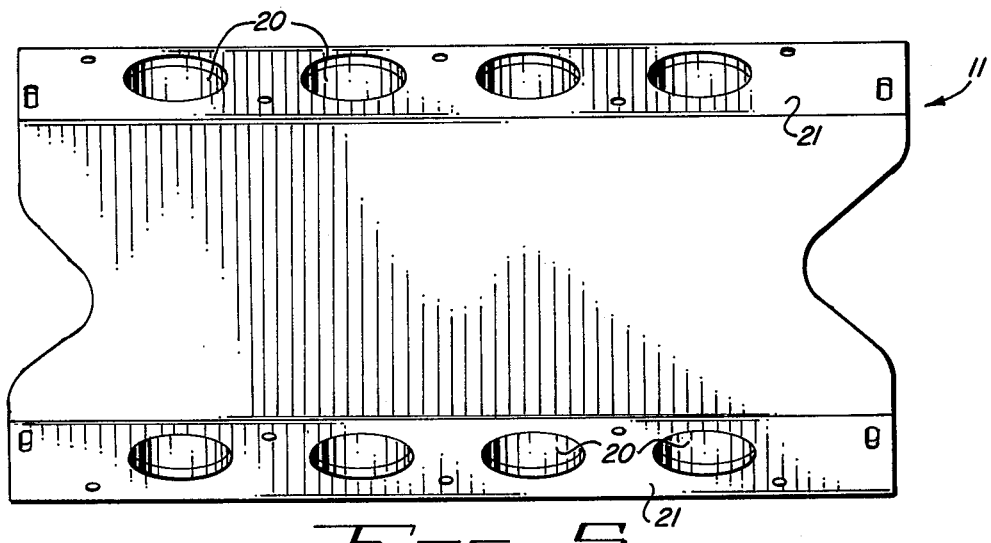
FIG. 5 is a bottom view of the intake manifold of FIGS. 1-4.

The cover plate 15 is fastened into place (as shown in FIG. 2) by means of bolts 34 extending through the apertures 32 in the cover plate 15 and engaged in the threaded holes 33 in the upper side wall 22 of the system 11. When the cover plate 15 is bolted to the remaining components as shown in FIG. 2, the interior of the system 11 forms a water jacket which surrounds the conduits 19.

Cooling water under pressure is introduced into the water jacket through the plumbing connections 41, circulates around the exterior of the conduits 19 and exits through the plumbing connections 42. In marine engine applications, the cooling water can, advantageously, be withdrawn from the water in which the boat containing the engine is operating, pumped under pressure to the fittings 41 and discharged under both through hoses connected to the fittings 42. In stationary engine applications, the cooling water is advantageously derived from a source separate from the conventional engine coolant system. In automotive applications, the cooling water will be supplied to the fittings 41 through separate hoses connected to the discharge of the engine radiator and the water exiting the fittings 42 will be returned to the inlet of the radiator.

The cooling water flowing through the cooling jacket serves to reduce the temperature of the air or air-fuel mixture flowing from the plenum 12 through the conduits 19 to the intake ports of the engine cylinders.

Having described my invention in such terms as to enable those skilled in the art to understand and practice it, and having described the presently preferred embodiment thereof, I claim:

1. In a fuel intake system for an internal combustion engine, said intake system including
   means for forming a fuel-air combustion charge, and
   means defining an inlet manifold for conducting at least the air component of said charge to the inlet ports of the combustion chambers of said engine,
the improvement whereby said air component is cooled before said combustion charge is introduced into said combustion chambers, said improvement comprising:
   (a) means defining a plenum to receive at least said air component;
   (b) separate conduits for separately conducting equal portions of at least said air component from said plenum to the inlet port of each of said combustion chambers;
   (c) cooling water jacket means surrounding each of said conduits, for conducting cooling water to and around substantially the entire outer surfaces to said conduits, to cool at least the air component of said combustion charge by indirect heat exchange with cooling water circulating therethrough; and
   (d) means for circulating cooling water as a single phase liquid through said cooling water jacket means.

* * * * *